United States Patent
Eversoll et al.

(10) Patent No.: US 9,092,796 B2
(45) Date of Patent: Jul. 28, 2015

(54) PERSONAL DATA MANAGEMENT SYSTEM WITH GLOBAL DATA STORE

(71) Applicant: SOLOMO IDENTITY, LLC, Madison, WI (US)

(72) Inventors: Elizabeth Eversoll, Verona, WI (US); Christopher W. Kelly, Madison, WI (US); Kyle McFarlane, Madison, WI (US); Ilirijan Residovski, Madison, WI (US)

(73) Assignee: SOLOMO IDENTITY, LLC., Madison, WI (US)

( * ) Notice: Subject to any disclaimer, the term of this patent is extended or adjusted under 35 U.S.C. 154(b) by 304 days.

(21) Appl. No.: 13/683,566

(22) Filed: Nov. 21, 2012

(65) Prior Publication Data

US 2014/0143838 A1    May 22, 2014

(51) Int. Cl.
| | |
|---|---|
| G06F 21/31 | (2013.01) |
| G06Q 30/02 | (2012.01) |
| G06F 21/62 | (2013.01) |
| G06Q 30/06 | (2012.01) |

(52) U.S. Cl.
CPC ............ *G06Q 30/02* (2013.01); *G06F 21/6254* (2013.01); *G06Q 30/06* (2013.01)

(58) Field of Classification Search
CPC .. G06Q 20/40; G06Q 30/0603; H04L 9/3271; H04L 9/3263
USPC ............ 726/2, 3, 4, 5, 7, 20, 21, 22; 713/156, 713/176, 168, 186
See application file for complete search history.

(56) References Cited

U.S. PATENT DOCUMENTS

| | | | |
|---|---|---|---|
| 6,950,943 | B1 | 9/2005 | Bacha et al. |
| 7,478,157 | B2 | 1/2009 | Bohrer et al. |
| 7,587,366 | B2 | 9/2009 | Grim, III et al. |
| 7,660,770 | B2 | 2/2010 | Grim, III et al. |
| 7,676,419 | B2 | 3/2010 | Weiss et al. |
| 7,680,819 | B1 | 3/2010 | Mellmer et al. |
| 8,027,975 | B2 | 9/2011 | Gabriel et al. |
| 8,042,163 | B1 | 10/2011 | Karr et al. |
| 8,060,508 | B2 | 11/2011 | Gabriel et al. |
| 8,312,273 | B2 | 11/2012 | Nice et al. |
| 8,321,413 | B2 | 11/2012 | Gabriel et al. |
| 8,327,450 | B2 | 12/2012 | Clement et al. |

(Continued)

FOREIGN PATENT DOCUMENTS

| | | |
|---|---|---|
| WO | 2012154673 | 11/2012 |
| WO | 2012177794 | 12/2012 |
| WO | 2013003603 | 1/2013 |

OTHER PUBLICATIONS

Natasha Singer; A Vault for Taking Charge of Your Online Life; NY Times Article; Dec. 8, 2012; NY Times; New York, USA.

(Continued)

*Primary Examiner* — Brandon Hoffman
*Assistant Examiner* — Nega Woldemariam
(74) *Attorney, Agent, or Firm* — Boyle Fredrickson S.C.

(57) ABSTRACT

A data vault system allows for centralized storage of personal data about a consumer in a transparent multi-tiered structure including a global data store and multiple vendor or category cards. Data in the category cards describing a subset of the globally stored data to be shared with individual vendors and provide fine resolution sharing control. The data in each structure is synchronized so that vendor or category cards may be auto populated.

17 Claims, 4 Drawing Sheets

(56) References Cited

U.S. PATENT DOCUMENTS

| | | |
|---|---|---|
| 8,392,420 B2 | 3/2013 | Mellmer et al. |
| 2008/0148362 A1 | 6/2008 | Gilder et al. |
| 2010/0185871 A1* | 7/2010 | Scherrer et al. ............... 713/186 |
| 2010/0186066 A1* | 7/2010 | Pollard .............................. 726/3 |
| 2013/0005487 A1 | 1/2013 | Frazzini et al. |
| 2013/0005488 A1 | 1/2013 | Evans et al. |
| 2013/0007012 A1 | 1/2013 | Selkowe Fertik et al. |
| 2013/0018877 A1 | 1/2013 | Gabriel et al. |
| 2013/0138999 A1* | 5/2013 | Tamura et al. ................. 714/6.2 |

OTHER PUBLICATIONS

Mark Sullivan; Personal Data Vaults Put You in Control of Your Data Online; PC World Article; Jul. 12, 2012; PCWorld; USA.

Min Mun at al.: Personal Data Vaults—A Locus of Control for Personal Data Streams; ACM CoNEXT 2010, Nov. 30-Dec. 3, 2010; Philadelphia, PA, USA.

Fatemeh Khatibloo; Personal Identity Management; Forrester Research Inc.; Sep. 30, 2011; Cambridge, MA. USA.

Phil Wolff; Personal Data Ecosystem Consortium; Article on Website (http://pde.cc/startup-circle/); Apr. 3, 2013; USA.

Website: Personal.com; Personal, Inc. 2013.

* cited by examiner

PERSONAL DATA MANAGEMENT SYSTEM WITH GLOBAL DATA STORE

STATEMENT REGARDING FEDERALLY SPONSORED RESEARCH OR DEVELOPMENT

Cross Reference to Related Application

Background of the Invention

The present invention relates to computerized systems for controlling the sharing of personal data in online transactions and the like and in particular to a system providing transparent, high resolution control of the dissemination of personal data including after-the-fact revocation of sharing.

The widespread use of online services makes the control of one's personal data increasingly difficult. Many such services expressly request personal data, but even when information is not consciously provided by a user, personal data from online activity, including search requests, purchases, and a user's location, may be collected and aggregated by online services and applications either for use by the service or application providers or to be sold to third parties.

Wholesale blocking of the tracking or use of personal data may be undesirable to the extent that the collection and use of personal data offsets the cost of services and applications that are otherwise desirable to the user. The collection of personal data may further enhance the efficiency of services provided to the user and allow the development of new services desired by the user.

Nevertheless, user concerns about information tracking are real, and instances of abusive or overreaching data collection jeopardize beneficial applications of such data collection and in the creation and offering of services that require or are otherwise supported by such data collection.

Online users, in theory, can safeguard their personal data by careful review of the contract terms and conditions of online service providers, but as a practical matter the transaction costs of such a review make this impractical for most individuals. In light of the difficulty of understanding and managing the use of personal data, a concerned user may logically default to a position of sharing no personal data.

SUMMARY OF THE INVENTION

The present invention provides a centralized and transparent clearinghouse for personal data through which a consumer may understand and control access to his or her personal data with respect to multiple third parties. Centralization allows consumers to reduce their transaction costs in supplying personal data and in updating that information to the extent that only a single location need be consulted and redundant data entry for different third parties can be avoided. The invention provides a clear, fine-grained index of the sharing status of a variety of types of personal data and allows this information to correct, append or even delete shared personal data even after it has been shared.

Specifically, in one embodiment, the present invention provides a method of managing personal data of consumers by providing a first data structure holding personal data linked to a consumer and multiple second data structures identified to different third parties and holding subsets of personal data of the first data structure. An authenticated data connection with a remote consumer electrical device is used for receiving personal data for an authenticated consumer the first and second data structures linked to the authenticated consumer. The personal data stored in the first and second data structures is synchronized and personal data of the second data structures is shared different third parties identified to the second data structures.

It is thus a feature of at least one embodiment of the invention to provide a centralized clearinghouse for personal information subject to well understood privacy guarantees that nevertheless provides for simple data entry by the consumer who may make use of previously entered and globally stored data.

The authenticated data connection may further provide a display of personal data of the first and second data structures at the remote consumer electrical device.

It is thus a feature of at least one embodiment of the invention to provide a system that is highly transparent and yet can accommodate data provided to many different third parties or used in multiple ways.

The authenticated data connection may further accept editing commands for the personal data through the authenticated data connection changing the personal data in the first or second data structure.

It is thus a feature of at least one embodiment of the invention to allow data entry or editing by the consumer either on a global basis or for a particular vendor without unnecessary duplication of effort.

The authenticated data connection may further accept display commands changing at least one of a sorting, filtering, or pagination of the personal data as displayed.

It is thus a feature of at least one embodiment of the invention to provide a method of managing potentially large amounts of data under the control of a single consumer by simplifying access and understanding of that data.

Each second data structure may be linked to a different third party.

It is thus a feature of at least one embodiment of the invention to provide an intuitive method of data organization (for example by different vendors) without unnecessarily duplicating the effort required by the consumer in providing that data.

Alternatively or in addition, the first data structure may be divided into multiple categories of personal data including the categories of: business, retail, and personal.

It is thus a feature of at least one embodiment of the invention to permit the consumer to organize his or her personal information in logical groupings that may for example be managed together.

The step of entering data may be performed through a link from a program specific to a third-party.

It is thus a feature of at least one embodiment of the invention to provide a seamless customer experience when the consumer in sharing data with a vendor while allowing the convenience of the centralized data store.

The second data structure may include a sharing status for different elements of the personal data of the data structure controlling how the third parties may share the data of the second data structures. The sharing status may provide conditional sharing according to conditions of the time limit for sharing or sharing for targeted advertising purposes or promotions, improvement of services or products, or aggregation with other data.

It is thus a feature of its least one embodiment of the invention to provide fine-grained control of personal information.

The display of sharing status may further display benefits gained or lost by sharing or not sharing of this personal data.

It is thus a feature of at least one embodiment of the invention to generate a brokerage system allowing the consumer to obtain maximum benefit from a sharing of their personal data.

DETAILED DESCRIPTION OF THE PREFERRED EMBODIMENT

Figure 1:
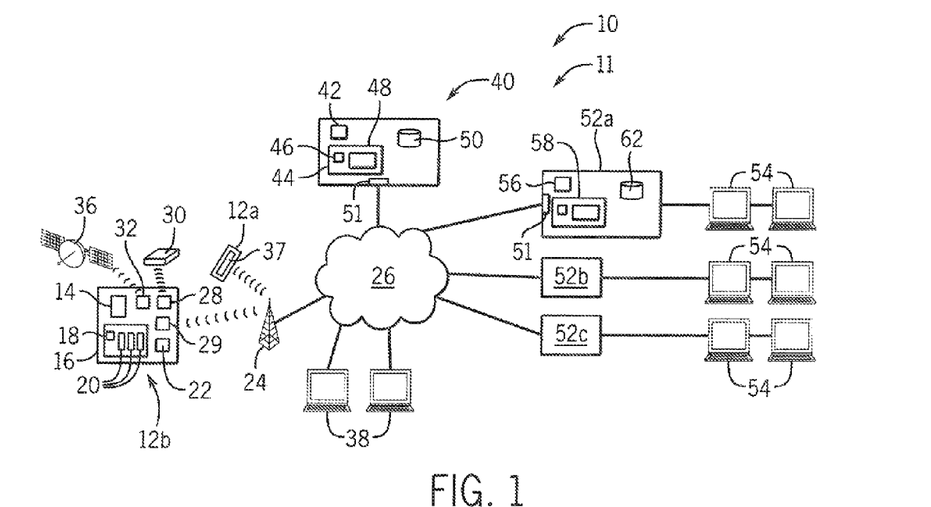
FIG. 1 is a block diagram of a computation environment suitable for use with the present invention providing multiple portable remote computing devices intercommunicating over the Internet with a data vault system of the present invention and multiple third party customer relationship systems including, for example CRM, POS or other similar systems.

Referring now to FIG. 1, an example online service system 10 providing a data vault system 11 of the present invention may provide multiple remote mobile consumer devices 12 such as cell phones, tablet computers, or the like.

As is generally understood in the art and as depicted with respect to mobile consumer device 12*b*, such mobile consumer devices 12 generally include a processor 14 communicating with a memory 16 that may hold an operating system 18 and one or more application programs 20. The mobile consumer device 12 may further include communication and location hardware such as a cell phone transceiver system 22 for communicating with a cell phone system through a cell phone tower 24. The cell phone transceiver system 22 may be used for the transmission of either or both voice and data, the latter of which may allow communication with websites on the Internet 26.

Alternatively or in addition, the mobile consumer device 12*b* may include a wireless transceiver 28 communicating with a local wireless server 30, for example, using a Wi-Fi, or other data communication technique as well as a near field communication module 29.

Often the mobile consumer device 12*b* will include a GPS receiver 32 receiving satellite signals from satellites 36 to provide for location information identifying the location of the mobile consumer device 12*b*.

As is generally understood in the art, the mobile consumer device 12 may also have a user interface screen 37 allowing for the display of graphic and textual information and the input of textual and/or image information through a keyboard, microphone, camera or the like.

A consumer using the mobile consumer device 12 may also have other computing resources at his or her disposal including, for example, a conventional desktop or laptop computer 38 also connected to the Internet 26. As will be generally understood in the art, these latter computers 38 also include a processor, memory, operating and application programs and the necessary network interface for Internet connection.

Generally, the present invention provides a data vault server 40 communicating with the Internet 26 through standard network interface 51 and therefore with the remote mobile consumer devices 12 and personal computers 38. The data vault server 40 may comprise one or more server systems as is understood in the art (including those implemented as cloud services) generally providing a processor 42 and a memory 44 holding an operating system 46 and a data vault program 48, as will be described in more detail below, such as may be executed by the processor 42. The data vault server 40 may further include a mass storage device 50, for example, implementing a database program necessary to track consumer personal data and sharing preferences as will be described below.

Also communicating with the Internet 26 and thus with the remote mobile consumer devices 12, personal computers 38, and data vault server 40 connected to the Internet 26, may be one or more vendor systems 52 that may be used to process consumer information, for example, for business planning, the routing of promotional information, the implementation of reward programs, and the offering and providing of other services. These vendor systems 52, may, for example, execute commercial customer relation management (CRM) programs, such as Salesforce commercially available from Salesforce.com, Inc. of San Francisco, Calif., and may be connected to multiple terminals 54 for access and use of customer information. Generally each of the vendor systems 52 will also include a processor 56, a memory 58 holding an operating system 59 and a CRM program 60, and a database system 62 of a type known in the art. It will be appreciated that the CRM program of these vendor systems 52 may in addition or alternatively be executed by or at the data vault server 40, for example, in a separate computer or as part of the data vault program 48, without communication over the Internet 26 but rather to implement a hosted CRM system.

Figure 2:
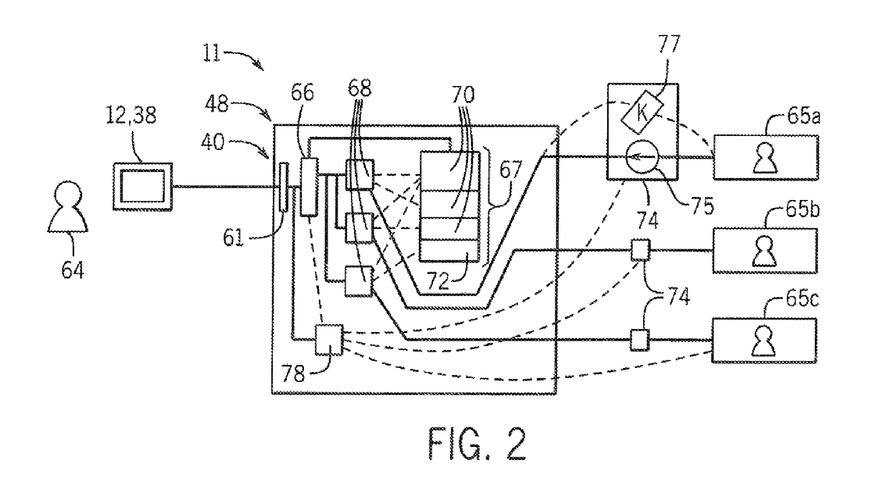
FIG. 2 is a logical diagram of the data vault of FIG. 1 showing the division of data into global data and vendor related data cards.

Referring now to FIG. 2, the data vault server 40 of the present invention may communicate with a consumer 64 through one of the mobile consumer devices 12 or general purpose computer 38 to receive personal data about the consumers 64 and provide that personal data in a controlled manner to multiple vendors 65 (for example, through their vendor systems 52). This personal data may be entered into the mobile consumer device 12 or general purpose computer 38 directly by the consumer 64 or may be collected automatically by the mobile consumer device 12 (for example, as is the case with location or usage data) or derived from communications between the mobile consumer device 12 and other third-party computer systems (for example, in recording purchases, sites visited and the like). In all cases, the consumer information will pass through a secure portal 61 using standard security techniques such as a secure socket layer, encrypted data, password and pin number to prevent unauthorized view of this data from the consumer side and to ensure that a consumer 64 has been authenticated to be that consumer 64 or a representative of that consumer 64 (authenticated consumers) before viewing or modifying data or sharing permissions.

As implemented by the program 48 on the data vault server 40, the personal data is received by a synchronization sub block 66 which allocates the data to global data store 67 and multiple vendor data cards 68. Typically a vendor data card 68 will be associated with a single vendor or brand, such as a store or retail outlet.

Each of the global data store 67 and vendor data cards 68 may be subject to independent and specific security domains with security keys specific to each consumer that can be reset in real time to provide response to security threats.

The global data store 67 may be divided into convenient categories 70 such as: business (related to the consumer's business), retail (related to the consumer's retail preferences and habits) and personal (related to data describing the consumer's person). Other categories 70, such as, for example, bowling (related to the consumer's bowling interests) can be envisioned. The global data store 67 may also include vendor specific data 72 typically unique to a given vendor.

Generally, the synchronization sub block 66 places all consumer personal data for a given consumer in the global data store 67 in separate storage areas unique to that consumer which is linked to subsets of this personal data for that consumer that may be contained in one or more of the vendor data cards 68. As new vendor data cards 68 are created, information in the vendor data cards 68 may be pre-populated from the global data store 67 based on common data names to the extent that this information has already been recorded by the consumer 64. This greatly simplifies the effort required by the consumer 64 who need not repeatedly provide information to different vendors 65 for the respective vendor card profiles. Only one layer of this hierarchy is shown, however, it will be appreciated that vendor data cards 68 may also be broken into subcategory cards (not shown) providing similar hierarchical and synchronized updating as will be described in greater detail below, while providing increasingly fine control of data by the consumer 64.

The consumer 64 may edit (correct, append or delete) the information in either the global data store 67 or the individual vendor data cards 68 and the synchronization sub block 66 serves to propagate those editing changes to the other location regardless of the point of editing. The synchronization may be implemented through indirect references to a single data store or by agents operating to synchronize multiple copies of the data in separate data stores. Changes in the data of the global data store 67 will be reflected to all vendor data cards 68 using that required data, thus providing vendors 65 with constantly updated information regardless of how that information is collected either in the global data store 67 or in any one of the vendor data cards 68. The information of the vendor data cards 68 is normally associated with a single vendor 65 and may be customized to that vendor 65.

The data in the global data store 67 and individual vendor data cards 68 are associated with permission status data, typically on a fine grained basis (e.g. each data element having a separate permission status) that defines whether the data will be shared with a vendor 65 or any vendor 65. The permission status may be implicit in deletion of the data by the consumer, for example, by editing of the data field value by backspacing over that data (which operates to revoke permission from the vendors 65) or explicit by changing the revocation status, in which case the data remains visible (for possible future sharing) in the global data store 67 or individual vendor data card 68 while nevertheless revoking permission from the vendors 65.

The permission status data controls sharing of associated personal data through a revocation element 74 between the data vault system 11 and the vendors 65. This revocation element 74 may have one or both of a technological feature 75 and legal feature 77. In one embodiment, the technological feature 75 may provide the vendor 65 with only a pointer or reference to particular elements of personal data in the vendor data cards 68. In this way, when data of the vendor data cards 68 is changed or erased those changes or erasures appear automatically to the vendor 65 who obtains the data for each use of the data by following the path of the pointer. Alternative systems using expiring cryptographic keys or cryptographic keys that can be changed by the consumer at their will and policies of "no caching" and the like may also be contemplated. Other possible methods of technological control include notifying the vendors 65, for example, by electronic message who agree contractually to remove or sequester the data, providing joint access to any cached data so that either party may modify the data and the like. These technological features 75 require that the personal data be collected through the data vault server 40 either by direct entry by the consumer 64 or by capture by application program or the like from automatic data generated by the mobile consumer device 12, to be held exclusively in the data vault server 40 or be controllable by the data vault server 40. Part of this control process may include a communication of evolving data use conditions to the vendors 65 as personal information and sharing conditions change, to be described below, for example, as a result of changes implemented by the consumer 64. These changed data use conditions may trigger the technological feature 75 or procedures at the vendor 65 under the terms of a legal feature 77

The legal feature 77 will typically be one or more contractual terms between operators of the data vault system 11 and representatives of the vendors 65 requiring the vendor 65 to erase and/or stop using the personal data when it has been deleted from the vendor data cards 68 or permission has been revoked per the permission status data. Additional contractual terms may also prevent the vendor 65 from copying or selling or otherwise transferring the personal data to others or to others not bound by similar contractual terms. A financial penalty may be established in the legal feature 77 in the event of breach of the terms related to sharing, the financial penalty being implemented either by liquidated damages, a bond, or an insurance contract. The financial penalty provides incentive for trustworthy use of the personal data and a potential source of compensation to the consumer 64 in the event of breach that may also help promote an environment of trust. Generally, the contract terms require that revocation of permission means that the personal data may not be used by any third party for any purpose or revealed to others in a manner so that personal data with revoke permission is equivalent to a state in which the personal data is in fact erased by the vendor 65. Importantly, the legal feature 77 does not require original or exclusive possession of the personal data by the data vault system 11 and may be used to "grandfather" vendors 65 into a trusting relationship with consumer 64 by later adoption of system of the data vault system 11 despite earlier data collection. It will be appreciated that revocation, like sharing, may be unconditional, or may provide consumer 64 with an additional set of options providing gradations in revocation. For example, the revocation may be for all personally identifiable uses of the data (typical) but may further go to uses of the data for the purposes of aggregation to develop, for example, propensity scores or the like, or possibly even anonymized data. In all cases of revocation, the consumer 64 is provided with immediate feedback of the action, for example, by a change in the status displayed to the consumer or by e-mail or the like confirming the revocation.

The execution of the program 48 on the data vault server 40 may provide a permission sub block 78 that communicates with the consumer 64 to manage permissions of data stored in either of the global data store 67 or vendor data cards 68. Generally, the permission sub block 78 manages editing of the permissions by the consumer 64 or other user authorized by the consumer 64 and synchronizing of permissions between each element of global data store 67 and corresponding permissions of each vendor data card 68 related to the same underlying data. Revocation of the sharing permission for a personal data element in a vendor data card 68 initiates a revocation through the revocation element 74 (regardless of the shared state in the global data store 67) for only a single vendor 65 associated with that vendor data card 68. A revocation of the sharing permission for a personal data element in the global data store 67, however, initiates a revocation through revocation elements 74 for that data element in the global data store 67 and in all vendor data cards 68 having a corresponding data element, regardless of the shared state in the vendor data card 68. Revocation of the data element in either the global data store 67 or the vendor data cards 68 may be accompanied by erasing the data element from view by the consumer 64 or may otherwise mark the data of the data element to indicate that it is no longer shared.

Figure 3:
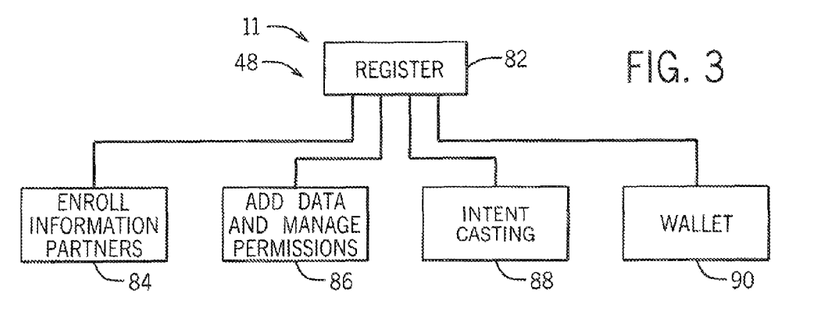
FIG. 3 is a flowchart of the principal operations of the data vault in managing personal data including enrollment of information partners, managing permissions, intent casting, and wallet functions.

Referring now to FIGS. 2 and 3, a program 48 implementing the data vault system of the present invention, may execute on any one of or in a distributed fashion on processor 42 of the data vault server 40, processor 14 of various mobile consumer devices 12 and processors 56 of vendor systems 52, to provide for five different tasks states.

A first task state, indicated by process block 82, registers a consumer 64 with the data vault system 11 and may include providing some personal data (possibly separate from the data vault global data store 67 and vendor data cards 68) needed for administration of the data vault system 11. This information, for example, may include name and contact information of the consumer 64, and the selection of a user name and password for logging into the data vault system to ensure that instructions and personal data come from a particular consumer 64. The registration process may include accepting a contractual agreement by the consumer 64 with respect to use of the system and an explanation of the operation of the data vault system 11.

Once registration is complete, the consumer 64 may make use of any of a number of services provided by the system represented by pendant tasks states of process block 84, 86, 88, and 90.

Generally process block 84 allows the consumer 64 to enroll information partners (e.g. vendors 65) with the data vault system 11 representing vendors 65 with whom the consumer 64 wishes to share information. This enrollment process implements the revocation elements 74 and sharing permissions described above with respect to future information shared by the consumer 64 although, as noted, may also apply contractually retroactively to information previously shared with these vendors 65.

Figure 4:
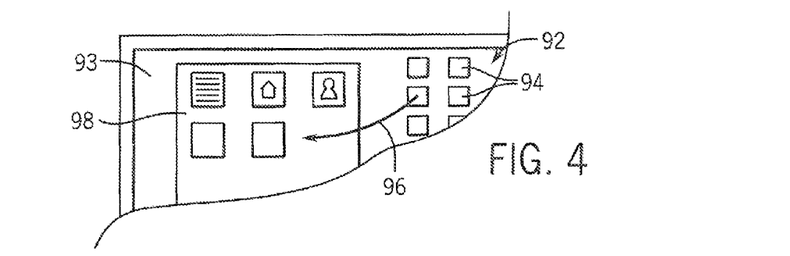
FIG. 4 is an example screenshot showing a graphic user interface for explicit enrollment of information partners.

Referring also to FIG. 4, in one embodiment, this enrollment process may be accomplished by providing the consumer 64 with a pool 92 of potential vendors 65 that have been prescreened as agreeing to participate in the data vault system 11. As depicted on an enrollment screen 93, these vendors 65 may, for example, be represented as icons 94 with images and text. This user interface allows the consumer 64 to see a wide variety of different vendors 65 he or she may be interested in sharing data with even if the consumer has had no previous contact with these vendors 65 and thus promotes useful sharing of personal data with a broad range of vendors 65. The icons 94 representing vendors may include conventional retailers as well as nonconventional service vendors, such as browser providers or map providers, which collect personal data in exchange for providing a mapping or browsing surface. By selecting these nonconventional service vendors, the consumer 64 may control the data collected by the services.

In this example, the individual vendors 65 represented by the icons 94 may be selected, for example, by sliding icons 94 as indicated by arrow 96 into an sharing pool 98 representing those vendors 65 with whom the consumer 64 wishes to share information per process block 84.

Typically, an icon 94 moved into the sharing pool 98 or another selection of an information partner per process block 84 will then cause a data entry screen to open (not shown) allowing the consumer 64 to enter the necessary personal data per process block 86 that may be desired by and/or unique to that vendor 65. This personal data may include identifying information such as the consumer's name, contact information, including electronic addresses through which the consumer 64 may wish to receive communications from the vendor 65, demographic information including gender, age income, and preference information including information about the consumer's tastes and interests. This process will be described below in more detail with respect to an alternative method of enrollment and data entry but generally will pre-populate the data entry screen with any information already entered into the global data store 67 and will require the user only enter preferred data unique to that vendor 65.

Figure 5:
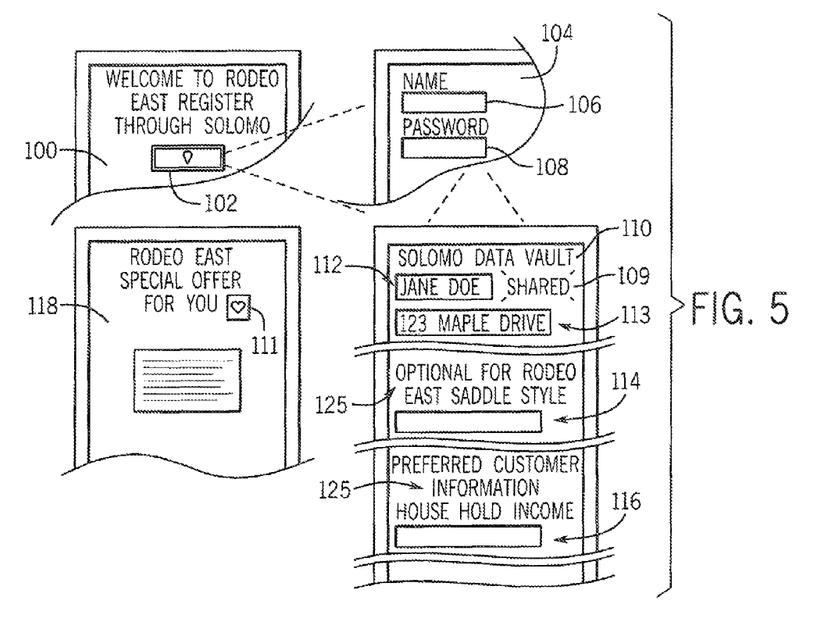
FIG. 5 is a set of fragmentary screenshots showing graphic user interfaces for implicit enrollment of information partners and the entry of data.

Referring to FIGS. 3 and 5, in many cases the process of enrolling information partners of process block 84 and adding data and managing permissions of process block 84 will be combined seamlessly with a visit to a vendor website or use of the vendor's application program. Either of these options may present to the consumer 64 a welcome screen 100, for example, displayed on the consumer's mobile consumer device 12 as generated by the vendor's software. On the welcome screen 100, an option may be provided for the consumer 64 to register to share personal data with the vendor 65 through the data vault system 11, for example, by activating a screen button 102.

When the consumer 64 presses this screen button 102, they may be transferred to a log-in screen 104 implemented by program 48 of the system 11 allowing them to log in to validate their identity, for example, with a name 106 and password 108. This log-in screen 104 may be triggered by information stored in the mobile consumer device 12 indicating that the consumer 64 has previously registered with the data vault system per process block 82. Otherwise, the consumer 64 may be transferred to a different screen allowing for complete registration per process block 82. It will be appreciated, that some of these security features may be offloaded to the vendor website.

Assuming that the consumer 64 has previously registered, the consumer 64 is transferred to a data entry screen 110 where the consumer 64 may enter any necessary personal data required by the particular vendor 65. This data entry screen 110 implements the process of process block 86 of adding personal data and managing sharing permissions for that personal data. Data that is being entered for the first time may be assumed to have a status of sharing as evidenced by the act of data entry in this context and by visual reinforcement 109.

As noted above, generally core data 112 from global data store 67 will be pre-populated in the data entry screen 110 greatly simplifying the task of entering data by the consumer 64. The data entry screen 110 may provide required data entry fields 113, optional data entry fields 114, and preferred data entry fields 116 corresponding with any of the data of the global data store 67 and vendor specific data 72. The data of the preferred data entry field 116 need only be entered if the consumer 64 wishes to be entitled to special consideration or benefits beyond those of a basic application to use of the vendor's website or application. Desirably, these benefits will be described on the data entry screen 110 or there will be a link to further explanation of these benefits.

These characterizations of required, optional, and preferred are generally unique to a vendor card 68 and may be stored therewith. In addition, the vendor cards 68 may hold metadata indicating whether all of the data in any of these characterizations has been entered. Thus, the metadata may indicate whether a preferred status has been obtained by the consumer 64 through filling out all of the necessary data fields. This meta data may be shared with the vendor 65 together with the shared data of the vendor card 68 as discussed above with respect to FIG. 2.

It will be appreciated, that there may be multiple preferred data entry fields 116 associated with different levels of preferred treatment. For example, special offers on boots may require entry of particular boot data and independent special offers on hats may require particular entry of data. This metadata may distinguish among these levels.

Welcome screen 100 and data entry screen 110 may be implemented through separate computer systems (for example, data vault server 40 and vendor system 52) but nevertheless are integrated seamlessly into the vendor website or application program from the perception of the consumer 64.

Upon completion of the data entry of screen 110 the consumer is returned to a vendor screen 118 which may, for example, provide general information from the vendor including, for example, special offers or benefits that have been triggered by the registration data entry by the consumer. An icon 111 representing the data vault system 11 and the fact that the consumer's personal data is being protected through the data vault may be displayed subsequent to this registration or log-in to provide the consumer 64 with assurance of data protection.

This process of enrolling information partners per process block 84 and adding data and managing permissions of process block 86 may thus be accomplished smoothly through a visit to a vendor website or use of the vendor application on the mobile consumer device 12. In one embodiment, the initial visit to the vendor website may be instituted by a URL encoded in an optically readable tag such as a QR code tag or Microsoft Tag.

Figure 6:
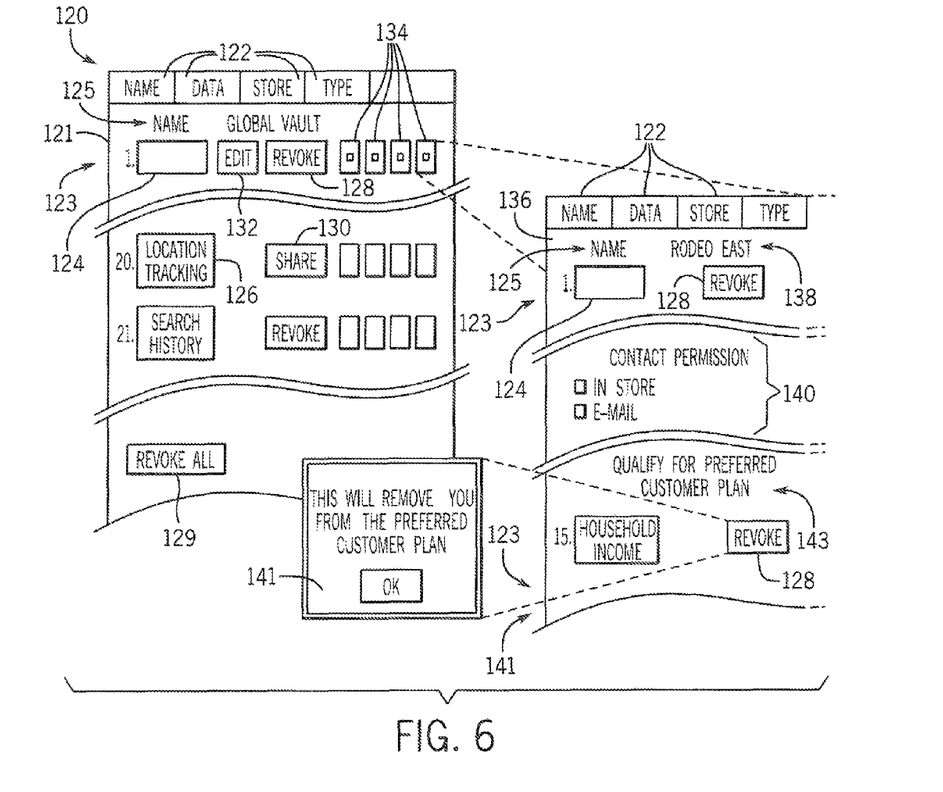
FIG. 6 is a set of fragmentary screenshots showing a graphic user interface for managing permissions for shared personal data.

Referring now to FIGS. 2 and 6, as noted above, entry of the personal data for the first time may provide a default permission to share the data with the vendor 65 as will be indicated by a sharing status indicator; however, the data vault system 11 of the present invention allows the status to be changed through a direct control of sharing permissions as well through a permission screen 120 usable by the consumer 64. This permission screen 120 will generally be accessed separately from any vendor site, for example, through a mobile consumer device 12 or a computer 38 by directing a browser to a web address of a Web server implemented by program 48 on the data vault server 40 and entering log-in information per screen 104 of FIG. 5.

In one embodiment, accessing the permission screen 120 will default to a global data screen 121 listing all shared personal data of the given consumer 64, for example, in a set of rows 123 providing one data element per row. A data element in this context means information that would not likely be edited or revoked separately. For a given consumer 64 the number of data elements may be substantial and, accordingly, sorting buttons 122 may be provided to sort the data for ready access, for example, providing sorting, filtering, and pagination, by name of the data element, or date of entry or modification of the data element, the particular vendor using that data element or the type of data element indicating roughly a degree to which the personal data would be considered sensitive to a typical individual. In this latter regard, address information might be considered less sensitive and body weight might be considered more sensitive.

Each row 123 may show a data name 125 of the type of data (e.g. user name) and/or the actual data value for that data type (e.g. Jane Doe), for example, in text box 124 which may be selected to edit or delete data. In some cases the data element will not be editable by the consumer 64 directly and only a category descriptor 126 (e.g. location tracking or the name provided in the global data store) will be provided. The rows 123 may be organized as discussed above into categories reflecting the category 70 of the global data store 67. For convenience, the sharing permission of data of all rows 123 within a category 70 may be edited in unison through a set of category controls (not shown) similar to those provided for each row 123. Vendor specific data 72 can be in a category denoted with that vendor.

Following the description or actual personal data element is an edit button 132 that may be activated to allow the user to edit the preceding data element, for example, allowing the user to change her or his name as shown. Changes in the global data screen 121 will be reflected into each of the vendor data cards 68 as has been described above. The data may also be deleted through this editing although it is preferred to use the revoke button as will be described.

As noted, each personal data element may be individually controlled with respect to a sharing status as may be implemented, for example, through a revoke button 128 which revokes an existing sharing permission or a share button 130 which allows sharing of previously revoked permission. As noted above, at the global level this revoke button 128 will revoke permissions for all vendors 65. The share button 130 at the global level does not provide permission for sharing to vendor 65 which must be accomplished in a vendor card level to be described below.

When the consumer 64 changes the status of any data element from shared to revoke, a warning message may be presented to the consumer 64 to the extent that the revoked data element may be part of an existing vendor card 68 as required data. This warning will indicate that revoking the sharing of this data element on a global basis will effectively cancel that vendor card 68. Similarly, if the data element whose sharing is being revoked is preferred data on any vendor cards, this warning will indicate that revoking sharing of this data will eliminate the privileges associated with the sharing of that data as discussed below.

Although in one embodiment pressing of the share button 130 may permit an unconditional sharing (as moderated by vendor cards be described below) it will be recognized that pressing the share button 130 may provide for an additional set of options to the consumer 64 providing gradations in the sharing permission. For example, the sharing may be limited to a duration such as a number of days or years, the sharing may provide limitations on whether the data can be used together with other data for the purposes of aggregation to develop, for example, propensity scores and the like, whether the data can be used if anonymized, whether the data can be redistributed (under the conditions of revocation), whether the data can be used to target advertising or promotions, for the improvement of products or services, and how and to what extent the consumer may be contacted based on the data.

These conditions on the use of data will be generally considered conditions of sharing in the present application. In one embodiment a revoke-all button 129 will be provided allowing the user to revoke all sharing of his or her information.

Following the permission buttons 128 and 130 may be a list of vendors sharing that information through vendor data cards 68, for example, represented by icons 134 to provide a visual indication of the vendor cards that will be affected.

Selecting any of these icons 134 will take the user to a view of the data visible by the particular vendor 65 alone or to this data and a vendor card sharing schedule 136 also providing sorting buttons 122 and all of the other features of the global data screen 121 but limited to data elements that are shared with a particular vendor 65 whose name is indicated, for example, in a caption 138.

The vendor card sharing schedule 136 may also include a sharing schedule 141 for data elements that are specific to a particular vendor 65 per preferred data 72. Generally, the preferred data 72 for particular vendor 65 will be personal data of particular value to that particular vendor 65, for example, household income, representing data that the consumer may not want to share broadly, or data that has unique value to a particular vendor, for example, the consumer's preferred vendor product or product configuration, such as hat size. As discussed above, often this preferred data will be associated with particular benefits that are obtained by the consumer 64 to encourage and incentivize such sharing. In these cases these preferred data elements may be labeled (for example with a link or caption 143) with the particular benefit obtained so that the consumer 64 may make the necessary decision about sharing. In one embodiment, pressing of the revoke button 128 associated with these preferred elements will bring up a reminder text box 141 indicating what benefits will be lost if this sharing is revoked. After review of this reminder text box 141, the user may continue the revoking process or may reconsider. The invention therefore provides for a form of brokerage between the consumer 64 and the vendors 65 allowing the consumer to receive value for providing personal information. This value may be in the form of rewards by a particular vendor or may be in the form of a common currency implemented by the data vault, for example, "badges" which may be redeemed by different vendors or non-vendors.

The vendor card sharing schedule 136 may further provide for contact permissions 140 indicating permissions for the vendor 65 to communicate with the consumer 64 through various means, for example, e-mail, texting, in-store notifications through an application, or the like and may place limits on automatic data collection for example consumer location as will be described below. An option may be provided with respect to the sharing screen 120 to allow any data element to be selected to display a list of all vendors using that data element (and allowing vendor specific adjustment of the sharing permissions) in order to provide ready access to sharing information about the data element.

Figure 7:
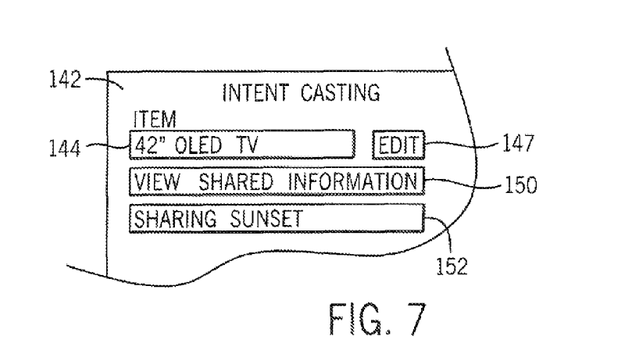
FIG. 7 is a set of fragmentary screenshots showing a user interface for intent casting.

Referring now to FIGS. 2, 3 and 7, the control of shared information may be extended to sharing with a group of unspecified or anonymous vendors, for example, to allow the consumer 64 to share information for the purpose of receiving competing offers for a product the consumer 64 wishes to buy. This is part of process block 88 and may be invoked through intent casting screen 142 presented to the consumer on the mobile consumer device 12 or computer 38. The intent casting screen 142 allows the user to describe a product or service for which they would like to receive sales offers, for example, by entry into a text box 144 a description of the product or service or selection of the product or service through a pull-down menu system (not shown) that defines general categories of products augmented by text key terms. This process may allow for later editing of the previous search for edit button 147 which allows changes in this requested service or product.

In order to obtain bids for this product or service, consumer 64 may be required to reveal some personal data and may optionally reveal other personal data. As before, this information may be subject to the global permissions of permission screen 120 and a special vendor card permission screen related particularly to intent casting to a set of vendors.

In this case, the permissions for sharing, for example, are accessible through a view sharing button 150 in the intent casting screen 142. The intent casting screen 142 may further provide options to the consumer 64 to enforce an information sunset option that may be set through button 152 and which allows a scheduled revocation of shared information, for example, in 60 days or other selectable time limit. This time limit may be, for example, a subjective "current" time or specific time categories such as "today", "this week", "this month", "this year", or "forever until revoked". At the conclusion of this time limit, the shared information may be fully revoked as described above for all vendors receiving this information. The intent casting screen 142 may further allow other limits to be placed on the sharing of personal data in this context including limits of using the personal data solely for the intent casting and geographic limitations on vendors who may view the personal data.

It will be appreciated that the intent casting screen 142 may also be used for "indirect" intent casting in which the consumer 64 may enter into text box 144 a generic category, for example, including: clothing, home furnishings, free offers, local offers, etc. that are not focused to a specific product but a category of products. As before the particular information being provided in this indirect intent casting may be fully controlled through buttons 150 and 152.

Figure 8:
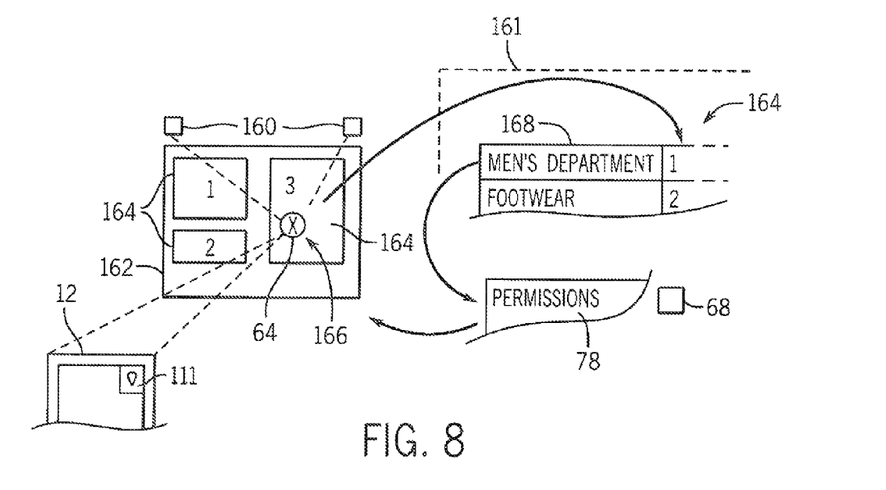
FIG. 8 is a fragmentary screenshot of a graphic user interface for permissions associated with personal data related to location.
Figure 9:
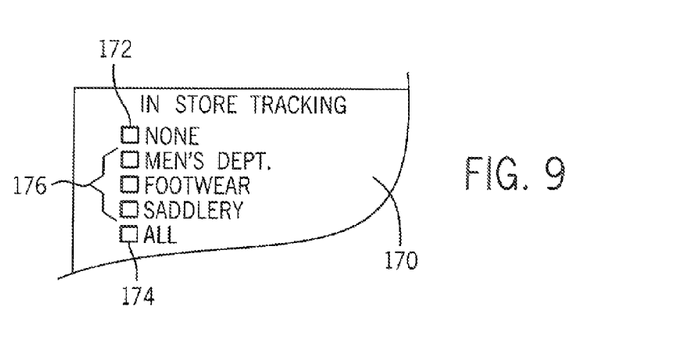
FIG. 9 is a data flow diagram of a location tracking system for in-store location tracking.

Referring now to FIGS. 8 and 9, an important source of personal data that may be managed by the data vault system 11 of the present invention is the location data automatically collected or collectible through many mobile devices. Generally it is understood that mobile consumer devices 12 such as cell phones may report GPS data or cell tower triangulation data indicating the location of the mobile consumer device 12. Current wireless systems without GPS or even cell phone capabilities may also provide capability for determining fine-grained location, for example, in a store or retail environment through triangulation techniques with wireless routers, near field communication techniques, echolocation, optical techniques or the like.

In this case, one or more wireless router transceivers 160 may be placed in separate locations about a retail floor area 162. The router transceivers 160 may communicate with a router control system 161 together to determine a location 166 of a mobile user (for example through triangulation) and may map that location into one of various departments zones 164 (e.g. department zone 3, as shown). The zones 164 may be arbitrarily defined to conform approximately to floor area dedicated to distribution of particular types of retail merchandise on the retail floor area 162. The zones 164 may be mapped to logical departments 168 (e.g. men's department) and this information used to determine information about the consumer 64 (for example, interests and shopping responsibilities) and/or to push promotional material such as coupons or notifications of sales to the consumer 64 in those departments 168. Control of this tracking information while the consumer 64 is within the retail environment may be indicated by the presence of the icon 111 on the mobile consumer device 12 as was described above.

The data vault system 11 allows control by the consumer 64 of the use of this location information, for example, through permission sub block 78 receiving permission data from the global data store 67 or vendor data cards 68. The consumer 64, in a manner analogous to that arrived above, may access a permission form 170 on a vendor data card 68 for the particular vendor 65 that may allow permissions to be set for sharing of all location data or no location data in that environment, for example, through radio boxes 172 or 174 for sharing in particular departments as indicated by radio boxes 176. Alternatively the location may be limited to a particular building or floor. More generally, permission may be granted for tracking only outdoors or indoors or any combination of the two. In this way, not only can personal data be protected, but a fine-grained sharing of that data may be provided. These selections or similar selections may also be used to control permissions to contact the consumer 64 in a particular department 168. As before, these permissions may include permissions for particular channels of communication to the consumer 64 so that the consumer may, for example, describe how coupons are to be transmitted to the consumer in the retail floor area 162 (e.g. through instant text message but not through e-mail). These contact permissions may be associated with particular departments 168, so that the consumer 64 may block promotional information delivered by text or e-mail except when the consumer is in particular departments 168 and, of course, may be unique to a particular on the vendor 65.

Figure 10:
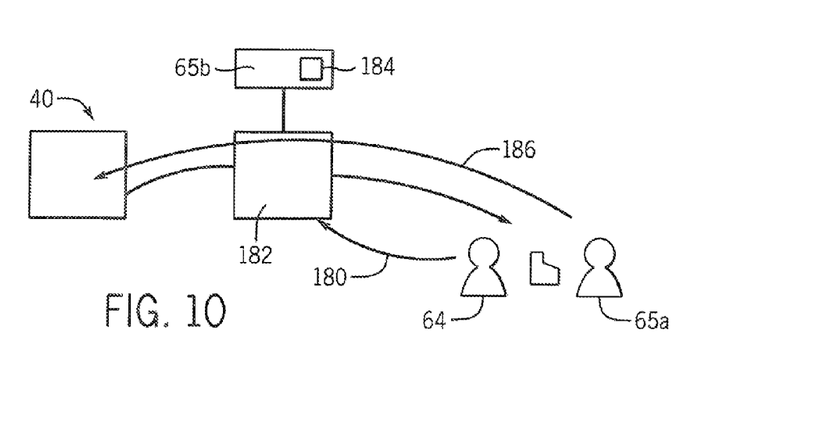
FIG. 10 is a data flow diagram for a wallet system providing control of personal data and real or virtual currency.

Referring now to FIG. 10, the present invention may be used to safeguard purchase information collected during retail transactions using electronic wallet systems that manage payment through the user's portable device such as a cell phone, or conventional credit card transactions. In such systems, the consumer 64 in making a purchase with a vendor 65a will provide authorization, as indicated by arrow 180, to a wallet system 182 that processes a payment back end communicating with a credit card account or debit card account 184, for example, managed by a bank vendor 65b. Any information related to the transaction, indicated by arrow 186, including purchase amount, the identity of vendor 65a, and the item being purchased, may be managed through the data vault server 40. While generally this information must remain accessible to the bank vendor 65b, such information is generally maintained at a higher level of privilege because of its financial implications. Vendor 65a, however, participating in this data vault system 11 will need to abide by the consumer 64 permission authorizations in use of this data.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to "a microprocessor" and "a processor" or "the microprocessor" and "the processor," can be understood to include one or more microprocessors that can communicate in a stand-alone and/or a distributed environment(s), and can thus be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications are hereby incorporated herein by reference in their entireties.

We claim:

1. A method of managing personal data of consumers comprising the steps of:
    (a) providing a first data structure holding personal data linked to a consumer;
    (b) providing multiple second data structures identified to different third parties and holding subsets of personal data of the first data structure;
    (c) providing an authenticated data connection with a remote consumer electrical device for receiving personal data for an authenticated consumer at the first and second data structures linked to the authenticated consumer;
    (d) synchronizing personal data stored in the first and second data structures; and
    (e) sharing personal data of the second data structures with different third parties identified to the second data structures;
    wherein the second data structures includes a sharing status for different elements of the personal data of the data structure controlling how the third parties may share the data of the second data structures;
    wherein the second data structures link data elements of the personal data of the first and second data structures to sharing status data and wherein the sharing status data for corresponding data elements of personal data of the first and second data structures are synchronized so that sharing of a data element with third parties can only occur if corresponding sharing status data of both the first and second data structures allow such sharing.

2. The method of claim 1 wherein the authenticated data connection further provides a display of personal data of the first and second data structures at the remote consumer electrical device.

3. The method of claim 2 wherein the authenticated data connection further accepts editing commands for the personal data through the authenticated data connection changing the personal data in the first or second data structure.

4. The method of claim 3 wherein the authenticated data connection further accepts display commands changing at least one of a sorting, filtering, or pagination of the personal data as displayed.

5. The method of claim 4 wherein the sorting displays an identification of the third parties with whom the personal data is shared on a per data basis.

6. The method of claim 5 wherein the sorting displays identification of personal data shared with third parties on a third party basis.

7. The method of claim 1 wherein each second data structure is linked to a different third party.

8. The method of claim 1 wherein the first data structure is divided into multiple categories of personal data including the categories of business, retail, and personal.

9. The method of claim 1 wherein the personal data includes data about the consumer selected from the group consisting of consumer contact information and consumer demographic information.

10. The method of claim 1 wherein the personal information includes location of the consumer.

11. The method of claim 1 wherein step (c) is performed through a link from a program specific to a third-party.

12. The method of claim 1 further wherein the sharing status provides conditional sharing according to conditions of: a time limit for the sharing.

13. A method of managing personal data of consumers comprising the steps of:
(a) providing a first data structure holding personal data linked to a consumer;
(b) providing multiple second data structures identified to different third parties and holding subsets of personal data of the first data structure;
(c) providing an authenticated data connection with a remote consumer electrical device for receiving personal data for an authenticated consumer at the first and second data structures linked to the authenticated consumer;
(d) synchronizing personal data stored in the first and second data structures; and
(e) sharing personal data of the second data structures with different third parties identified to the second data structures;
wherein the second data structure includes a sharing status for different elements of the personal data of the data structures controlling how the third parties may share the data of the second data structures;
wherein the sharing status provides conditional sharing according to conditions of a purpose for the sharing selected from the group consisting of: targeting advertising or promotions, improvement of products or services, aggregation with other data.

14. The method of claim 13 wherein the sharing status includes a stares of revocation retracting permission for sharing personal data of the second data structures with different third parties identified to the second data structures after permission has previously been granted.

15. The method of claim 13 wherein the sharing status provides conditional sharing according to a purpose of aggregation with other data.

16. A method of managing personal data of consumers comprising the steps of:
(a) providing a first data structure holding personal data linked to a consumer;
(b) providing multiple second data structures identified to different third parties and holding subsets of personal data of the first data structure;
(c) providing an authenticated data connection with a remote consumer electrical device for receiving personal data for an authenticated consumer at the first and second data structures linked to the authenticated consumer;
(d) synchronizing personal data stored in the first and second data structures; and
(e) sharing personal data of the second data structures with different third parties identified to the second data structures;
wherein the second data structure includes a sharing status for different elements of the personal data of the data structure controlling how the third parties may share the data of the second data structures;
wherein a sharing status of the personal data includes permissions for contacting the consumer and step (d) accepts input from the consumer changing the permissions for contacting the consumer.

17. The method of claim 16 wherein the display of sharing status further displays vendor offers to the authenticated consumer that are affected by sharing or not sharing of this personal data.

* * * * *

UNITED STATES PATENT AND TRADEMARK OFFICE
CERTIFICATE OF CORRECTION

| | | |
|---|---|---|
| PATENT NO. | : 9,092,796 B2 | Page 1 of 1 |
| APPLICATION NO. | : 13/683566 | |
| DATED | : July 28, 2015 | |
| INVENTOR(S) | : Elizabeth Eversoll | |

It is certified that error appears in the above-identified patent and that said Letters Patent is hereby corrected as shown below:

IN THE CLAIMS

CLAIM 14　　　　Delete "stares" and substitute therefor
Col. 16, Line 11　　　-- status --

Signed and Sealed this
Twenty-fourth Day of November, 2015

Michelle K. Lee
*Director of the United States Patent and Trademark Office*